(12) United States Patent
Zhu et al.

(10) Patent No.: US 7,817,544 B2
(45) Date of Patent: Oct. 19, 2010

(54) METHODS AND APPARATUS FOR EVENT DISTRIBUTION IN MESSAGING SYSTEMS

(75) Inventors: Zhongwen Zhu, Saint-Laurent (CA); Huiping Zhang, Brossard (CA)

(73) Assignee: Telefonaktiebolaget L M Ericcson (Publ), Stockholm (SE)

( * ) Notice: Subject to any disclaimer, the term of this patent is extended or adjusted under 35 U.S.C. 154(b) by 218 days.

(21) Appl. No.: 11/963,996

(22) Filed: Dec. 24, 2007

(65) Prior Publication Data

US 2009/0161548 A1 Jun. 25, 2009

(51) Int. Cl.
*H04J 3/14* (2006.01)
(52) U.S. Cl. .................................. 370/230.1; 370/237
(58) Field of Classification Search ........................ None
See application file for complete search history.

(56) References Cited

U.S. PATENT DOCUMENTS

| | | | |
|---|---|---|---|
| 4,577,272 A | 3/1986 | Ballew et al. | |
| 2001/0010717 A1* | 8/2001 | Goto et al. | 379/127.01 |
| 2001/0047446 A1 | 11/2001 | Liu et al. | |
| 2002/0152305 A1* | 10/2002 | Jackson et al. | 709/224 |
| 2004/0205752 A1* | 10/2004 | Chou et al. | 718/100 |
| 2006/0142021 A1* | 6/2006 | Mueckenheim et al. | 455/453 |
| 2006/0212873 A1 | 9/2006 | Takahisa | |
| 2006/0230263 A1* | 10/2006 | Bhogal et al. | 713/100 |
| 2006/0285013 A1* | 12/2006 | Lee et al. | 348/515 |
| 2007/0033395 A1* | 2/2007 | MacLean | 713/157 |
| 2007/0133468 A1* | 6/2007 | Hara | 370/331 |
| 2008/0034051 A1* | 2/2008 | Wallis et al. | 709/207 |
| 2009/0055835 A1* | 2/2009 | Zhu | 718/105 |
| 2009/0116513 A1* | 5/2009 | Gray et al. | 370/475 |

OTHER PUBLICATIONS

I. Ahmad: "A Massive Parallel Fault-Tolerant Architecture for Time-Critical Computing", The Journal of Supercomputing, Kluwer Academic Publishers, Jan. 1, 1995, XP000521886AI, pp. 135-162.
A.M. Deplanche et al.: "Task Redistribution with Allocation Constraints in a Fault-Tolerant Real-Time Multiprocessor System", Distributed Processing, Elsevier Science Publishers B.V. (North-Holland), Oct. 1, 1987; XP000957733AI, pp. 133-150.
T.A. Varvarigou et al.: "Distributed Reconfiguration of Multiprocessor Systems", Oct. 25-27, 1994; XP000533659AI, 1994 IEEE, pp. 212-221.
International Search Report from corresponding PCT Application No. PCT/IB2008/055052.

* cited by examiner

*Primary Examiner*—Min Jung
(74) *Attorney, Agent, or Firm*—Dilip C. Andrade; Alex Nicolaescu; Ericsson Canada Inc.

(57) ABSTRACT

Methods and apparatus for distributing events among a set of traffic processor in a telecommunication network. The methods and apparatus determines a traffic processor from the set of traffic processors with the lowest traffic load, the traffic load is determined for each traffic processor of the set of traffic processors based on a weighting factor, an event queue length of a traffic processors and a current traffic load. Events are re-distributed when a change occurs in the set of traffic processors. The re-distribution is based on a determination of an allowable event queue length for each traffic processor of the set of traffic processors, which is based on the current traffic load, an optimal traffic load and a maximum event queue length.

22 Claims, 9 Drawing Sheets

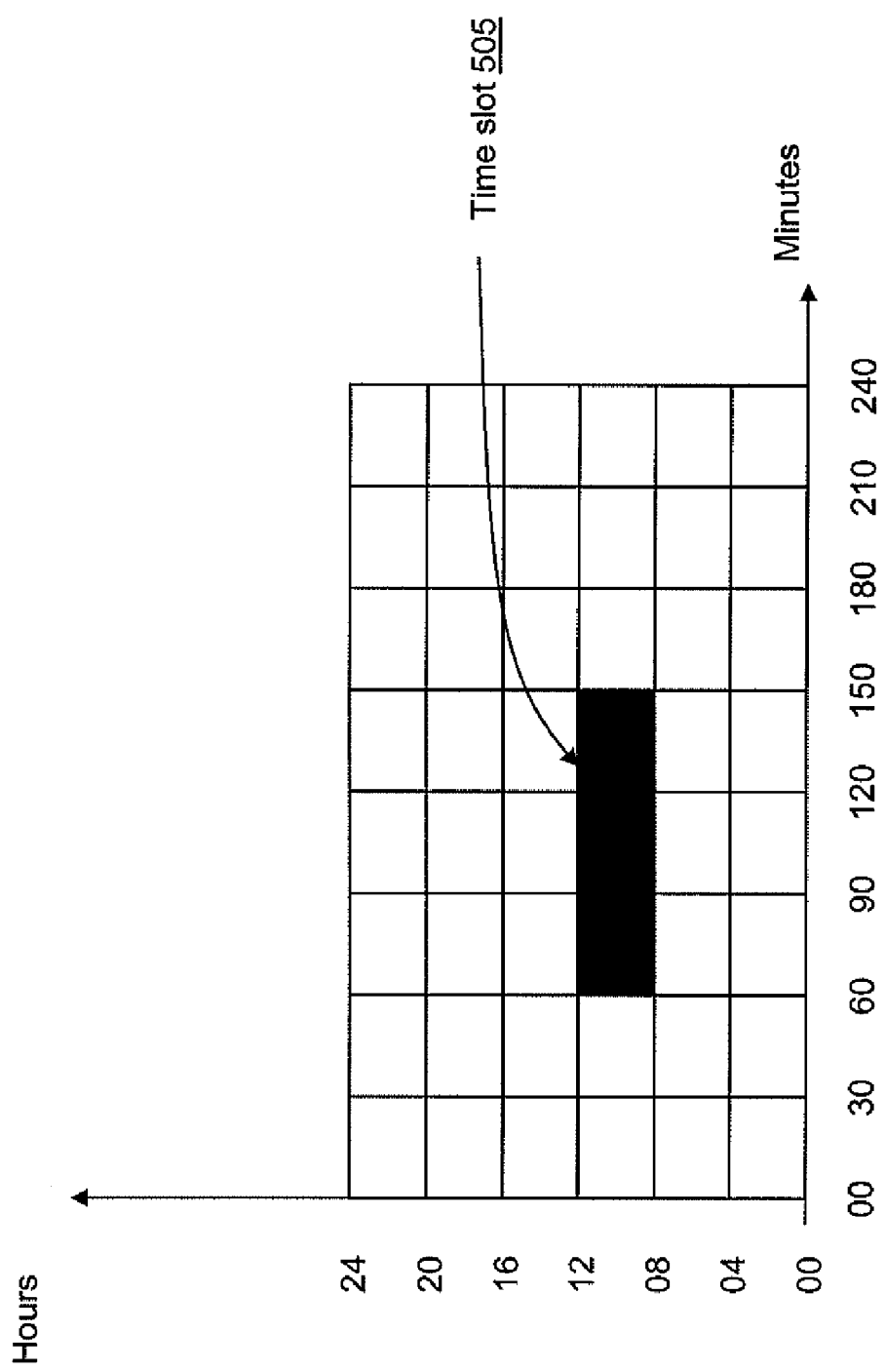

US 7,817,544 B2

METHODS AND APPARATUS FOR EVENT DISTRIBUTION IN MESSAGING SYSTEMS

TECHNICAL FIELD

The present invention generally relates to messaging methods and systems and, more particularly, to methods and systems for providing messages delivery in messaging systems.

BACKGROUND

Communication devices and systems in general, and messaging systems in particular, continue to gain in popularity. Paging, instant messaging (IM), text messaging on cell phones (e.g., SMS) and multimedia messaging (MMS) are examples of messaging systems which have enjoyed popularity over the years. In order to enrich end-user experience and allow the end-user more freedom in choosing media formats, the capabilities of messaging services are continuously being improved. In making these improvements, however, designers should provide backward compatibility, i.e., such improvements should not lead to a situation where a user of a new messaging service or technology can only communicate with other users that are enabled for the new messaging service or technology. Therefore, efforts should be made to support interworking between new messaging technologies and well-established messaging technologies to provide for a smooth migration of new technologies into a world of integrated messaging.

With the advent of multimedia and 3G (and soon 4G) in the telecommunication area, it technically is no longer necessary to predicate the manner in which communications are performed on the type of media that is being communicated, i.e., 3G and 4G telecommunications are intended to be more media independent than previous generations of communications technology. Nonetheless, the introduction of new messaging functionality still, at least initially, tends to create a fragmentation of communication capabilities, as it is virtually impossible to upgrade all of the users in a system to the latest technology at the same time.

Each of these service centers has their own message store, their own user directory, their own notification server and, sometimes, their own O&M system and their own event scheduler. An event scheduler handles the incoming and outgoing messages for a messaging delivery system. If the messaging delivery system is used in a telecom network, event schedulers have telecom grade characteristics, e.g. High availability and Scalability, etc.

In a messaging delivery system, the event scheduler is designed to be co-located with the messaging server. The event scheduler handles the events associated to multiple traffic processors for event delivery of messages to user equipments (UEs). When a failure within traffic processors occurs or when a traffic processor is added to the messaging system, the traffic load has to be balanced between the remaining traffic processors for avoiding congestion within the traffic processors or underutilization of some traffic processors. Furthermore, the traffic load for the messaging server needs to be balanced in a short amount of time. Existing traffic load management solutions in massaging system fail to disclose a method and apparatus for load balancing of events.

Accordingly, it would be desirable to have a solution for load balancing between traffic processors in order to avoid the afore-described problems and drawbacks.

SUMMARY

It is a broad aspect of the invention to provide a method for distributing event delivery for a set of traffic processors in a telecommunication network. The method obtains a status for each active traffic processors of the set of processors in the telecommunication network by an event scheduler, determines a traffic processor having the lowest traffic load from the set of traffic processors, based on the obtained status for each active traffic processor. The method further determines an allowable event queue length for each traffic processor of the set of traffic processors, the event queue length being a threshold for redistributing event delivery. Afterwards, the method re-distributes the event among the set of traffic processors starting with the traffic processor having the lowest traffic load and without exceeding each determined allowable event queue length.

The method further detects a permanent or temporarily failure of at least one traffic processor and allows adding at least one traffic processor to the set of traffic processors.

It is another broad aspect of the invention to provide a communication node having an event scheduler group for distributing event delivery to a set of traffic processors and an event scheduler group manager for managing the communication node and the set of traffic processors. The event scheduler group manager obtains a status for each active traffic processor of the set of traffic processors, determines a traffic processor having the lowest traffic load from the set of traffic processors based on the obtained status for each active traffic processor determines an allowable event queue length for each traffic processor of the set of traffic processors, the event queue length being a threshold for redistributing event delivery and re-distributes the event delivery among the set of traffic processors starting with the traffic processor having the lowest traffic load and without exceeding each determined allowable event queue length.

The event scheduler group manager further detects a permanent or temporarily failure of at least one traffic processor and allows adding at least one traffic processor to the set of traffic processors.

BRIEF DESCRIPTION OF THE DRAWINGS

The foregoing and other aspects, features, and advantages of the invention will be apparent from the following more particularly detailed description as illustrated in the accompanying drawings in which reference characters refer to the same parts throughout the various views. The drawings are not necessarily to scale, emphasis instead being placed upon illustrating the principles of the invention.

FIG. 5 is an example of a time slot of a traffic processor in accordance to the invention;

DETAILED DESCRIPTION

In the following description, for purposes of explanation and not limitation, specific details are set forth such as particular architectures, interfaces, techniques in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
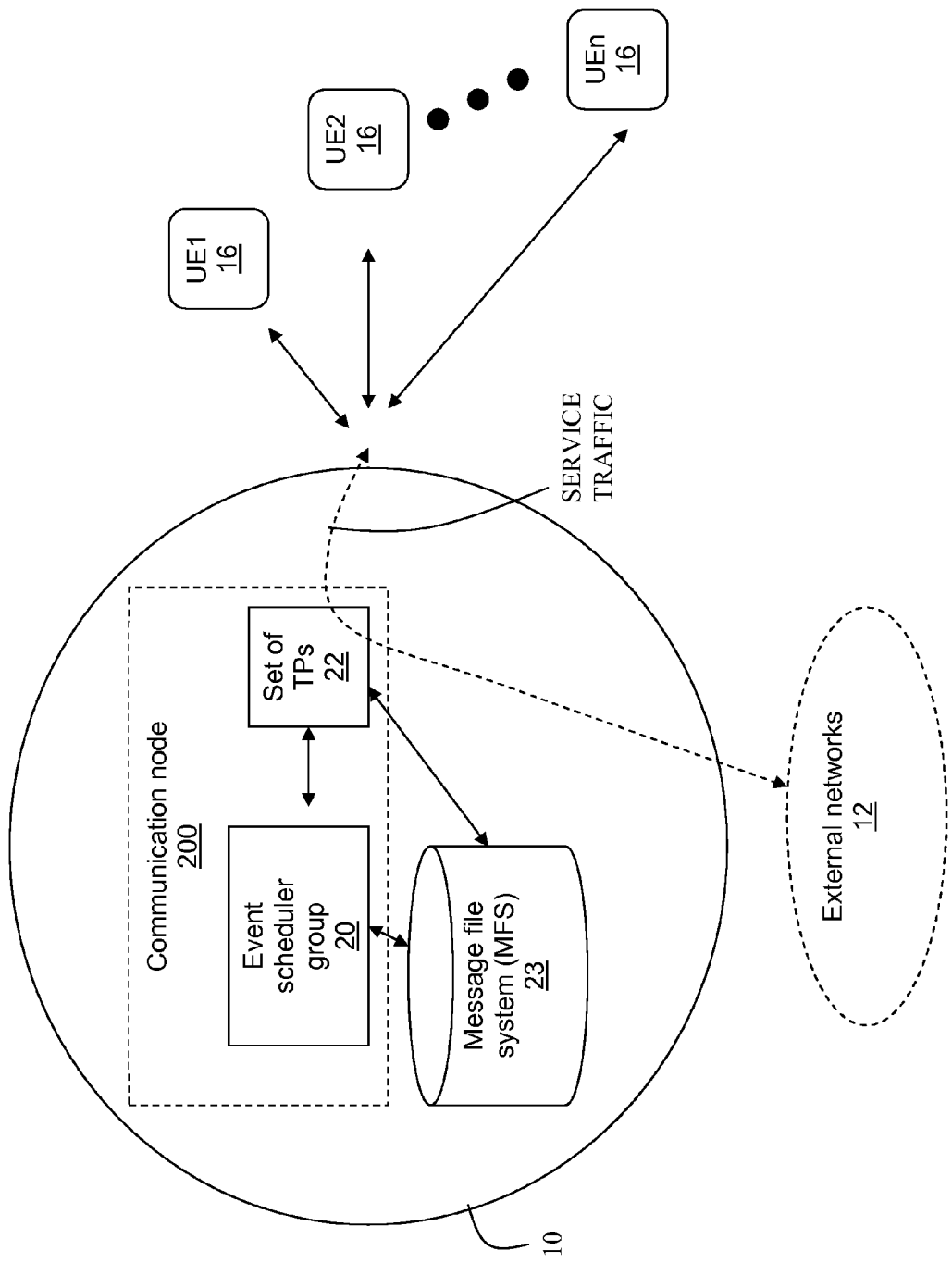
FIG. 1 is a schematic diagram illustrating a telecommunication network that includes a group of event schedulers and a set of traffic processors for managing events in the telecommunication network in accordance to the invention.

Reference is now made to FIG. 1, which illustrates a telecommunication network 10 that includes a messaging file system (MFS) 23, a communication node 200 comprising event scheduler group 20 and a set of traffic processors (TPs) 22 for managing events in the telecommunication network 10 in accordance to the invention. An event is either delivery event or expire event. An event is used to handle the message. The messages are stored in the MFS 23 as message file with special format. The MFS stores a copy of messages and associates the stored messages to be delivered to the TP 24 and ultimately to UEs 16. The MFS 23 can be any database or repository capable of storing messages (e.g. headers and body of messages).

The set of TPs 22, which can also be viewed as servers or communication nodes, may be connected to one or more external networks 12 (e.g., the Internet), for delivering messages to one or more subscribers, represented as user equipment 16 (denoted in the drawing as multiple subscriber devices UE1, UE2, ..., UEN). The UEs can be any mobile terminal or fixed personal computer (PC). The network 10 can be any packet data network, while not being limited to, an Internet Protocol (IP) Multimedia Subsystem (IMS). Thus the message sent in to UEs may be, while not being limited to, a Short Message Service (SMS) message, an IMS message or a Multimedia Messaging Service (MMS) message. The network 10 may use any packet data communication protocols for sending messages to UEs, while not being limited, e.g. Session Initiation Protocol (SIP), published by Internet Engineering Task Force (IETF), www.ietf.org, Request For Comments (RFCs) or any 3G or 4G communication protocols.

Figure 2:
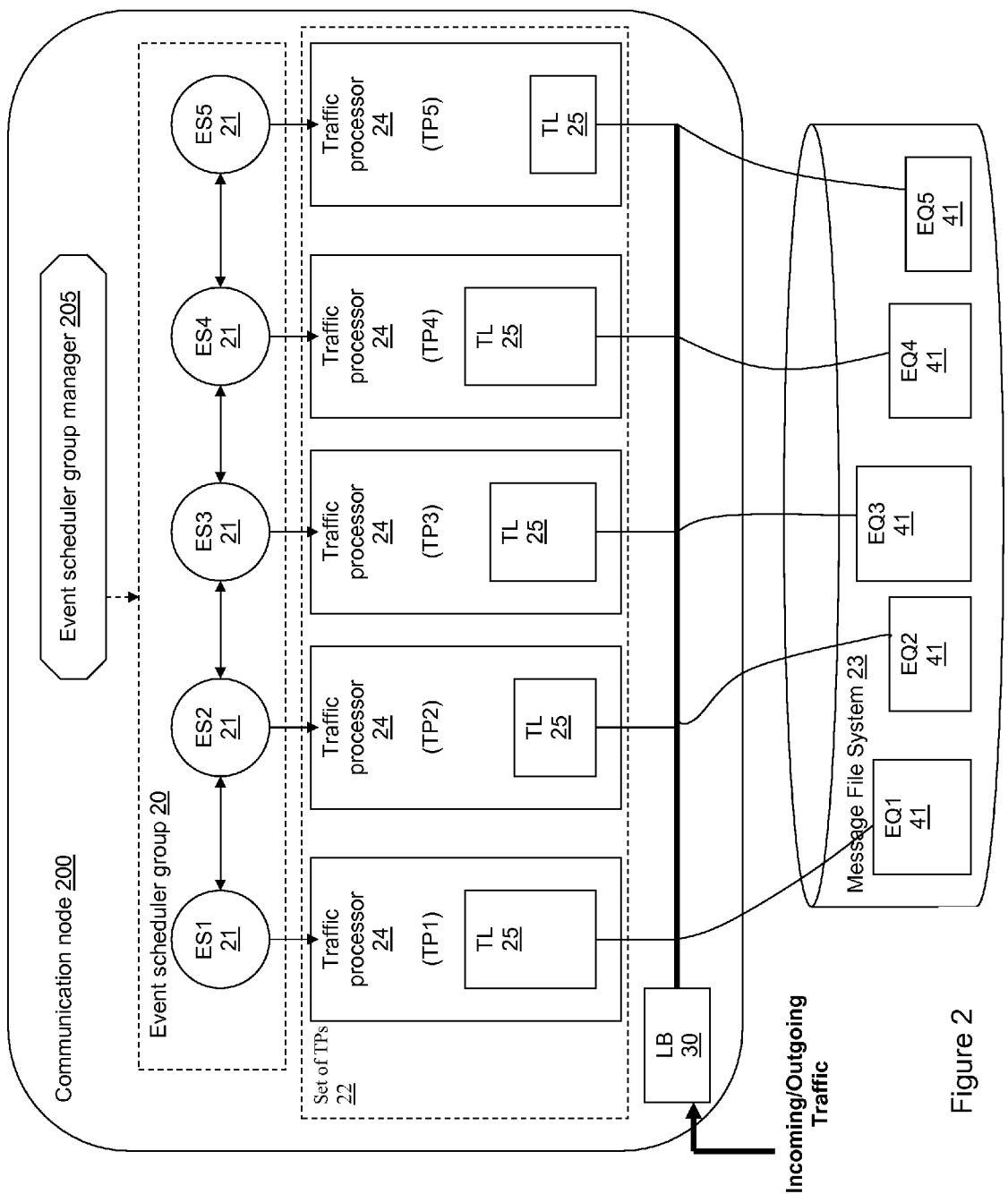
FIG. 2 is a schematic diagram illustrating a detailed view of a communication node in accordance to the invention.

FIG. 2 provides a more detailed view of the communication node 200, which can be any messaging. In FIG. 2, the set of TPs 22 is broken out as a number of individual traffic processors 24 in the communication node, each having a traffic load (TL) 25 of events (e.g. messages). As shown on FIG. 2, each TP 24 accesses its own corresponding EQ 41 stored in the MFS 23. The drawing illustrates TP1 ... TP5, but those skilled in the art will appreciate that greater or lesser numbers of traffic processors may be involved. Indeed, it should be understood that there may be multiple traffic processor sets 22, each set having a corresponding event scheduler group 20, which consists of event schedulers (ES) 21. Additionally, or alternatively, there may be one or more event schedulers 21, each managing multiple traffic processors sets 20. An event scheduler (ES) 21 schedules a delivery event for an incoming message according to the roles provided by a messaging server, schedules an expire event for the incoming message, instructs a message server to deliver the message when a delivery event is triggered, instructs a message server to handle the expired message when a expired event is triggered, provides the clean up mechanism to handle the orphan files (delivery or expire event files) in a messaging system (e.g. communication node 200) and stores delivery and expire events in the MFS 23. The event scheduler group 20 is able to find out which TP is added or fails by using some communication tools, such as "heart-beat mechanism", which allows the event scheduler group 20 to detect a change in the set of TPs 22 in a short amount of time. Each ES 21 is responsible for reporting the status of its associated TP or TPs (i.e. TL 25 and EQ 41) in order to be voted for an event scheduler group manager 205. ES 21 can also keep the copy of EQ 41 to improve the performance. If it is the case the ES 21 synchronizes the corresponding EQ 41 in MFS 23 from time to time.

The communication node 200 also comprises an event scheduler group manager 205, which is selected based upon the status (traffic load and event queue length) of an ES 21. The event scheduler group manager 205 is responsible for re-distributing the event queue across the set of TPs 22. As soon as the event scheduler becomes "event scheduler group manager 205", the manager 205 becomes in charge of handling the re-distribution of event queue across the set of TPs 22. The event scheduler group manager 205 may change from time to time according to the TL 25 and EQ 41 of the communication node 200. The event scheduler group manager 205 is selected by the group 20 and the event scheduler group manager that is acting as event scheduler group manager before a new selection.

The communication node 200 also comprises a load balancing (LB) functionality 30 for managing incoming/outgoing traffic from/to the telecommunication network 10 and the UEs 16. The LB 30 is connected to each TP and adjusts the TL 25 for each TP 24. The traffic load is managed based on criteria defined by the event scheduler group manager 205 and based on defined algorithms. The event may be, while not being limited to, the number of message requests, etc.

Figure 3:
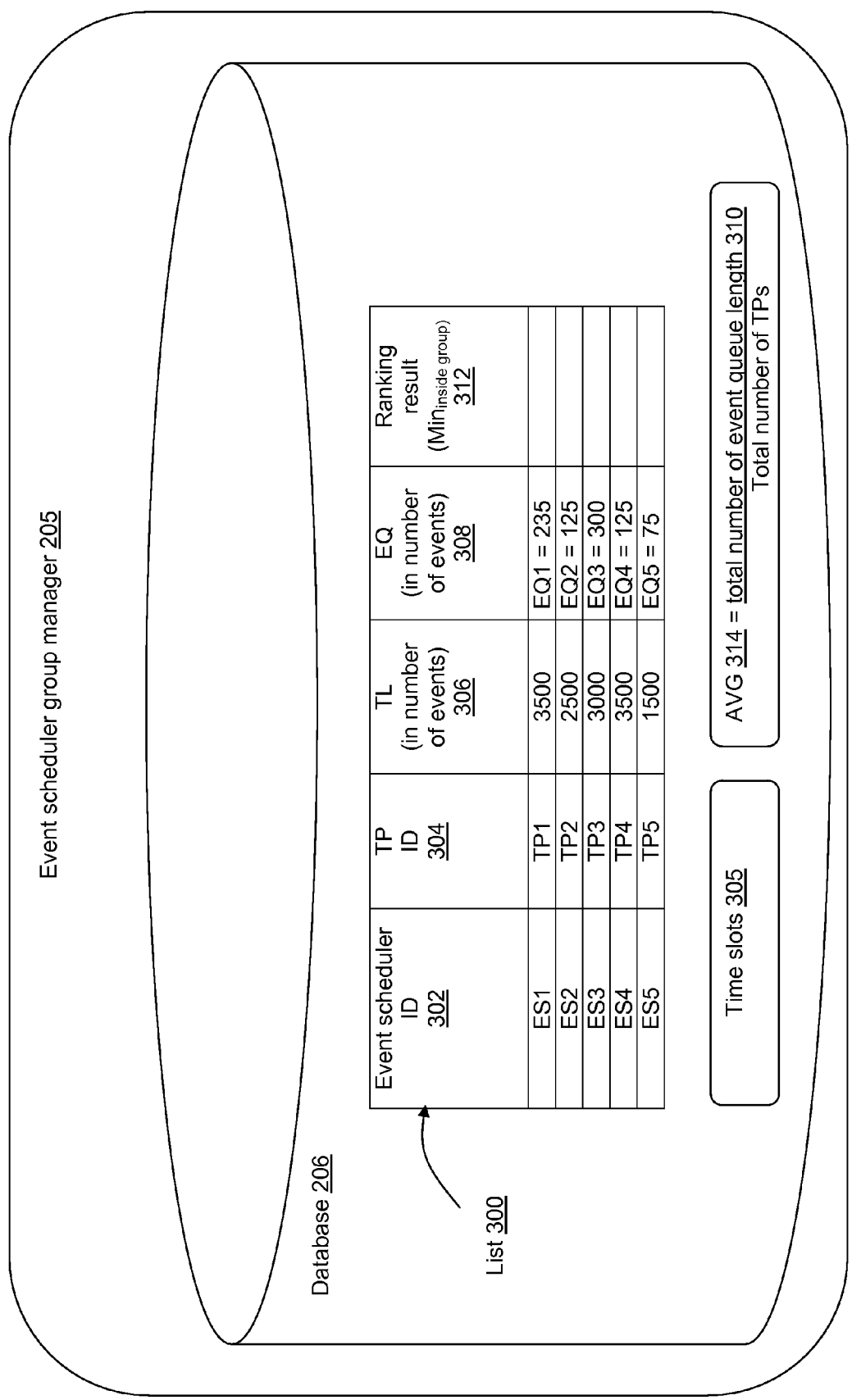
FIG. 3 is detailed view of an event scheduler group manager in accordance to the invention.

FIG. 3 provides a detailed view of the event scheduler group manager 205. The event scheduler group manager 205 comprises a database 206 in which is stored a list 300 of ES 21 and TP 24 of the communication node 200 and the TL 25 associated to each TP 24 and results of calculations made by the event scheduler group manager 205 (e.g. Ranking result ($Min_{inside\_group}$) 312). Each ES 21 stores this list 300 manages the list when it becomes the event scheduler group manager 205. The group manager 205 distributes the TL 25 among them. The list 300 comprises event scheduler IDs 302, TPs IDs 304, the traffic load 306 for each TP, the event queue length 308 for each TP and a ranking 312 for the TPs. The database 206 can be any persistent memory like a Read-Only Memory (ROM) or volatile memory like a Random access memory (RAM), or a Structured Query Language (SQL) database, etc. The ESs 21 and the TPs 22 may be software hardware or any combination thereof.

In case of some traffic processor failure, the system shall still perform as it used to be. When the failed processor recovers, the system returns to normal operation. In order to handle the crashed TP or add new processor in communication node 200 to increase overall traffic load, the re-distribution of tasks to the traffic processors is required.

Figure 4A:
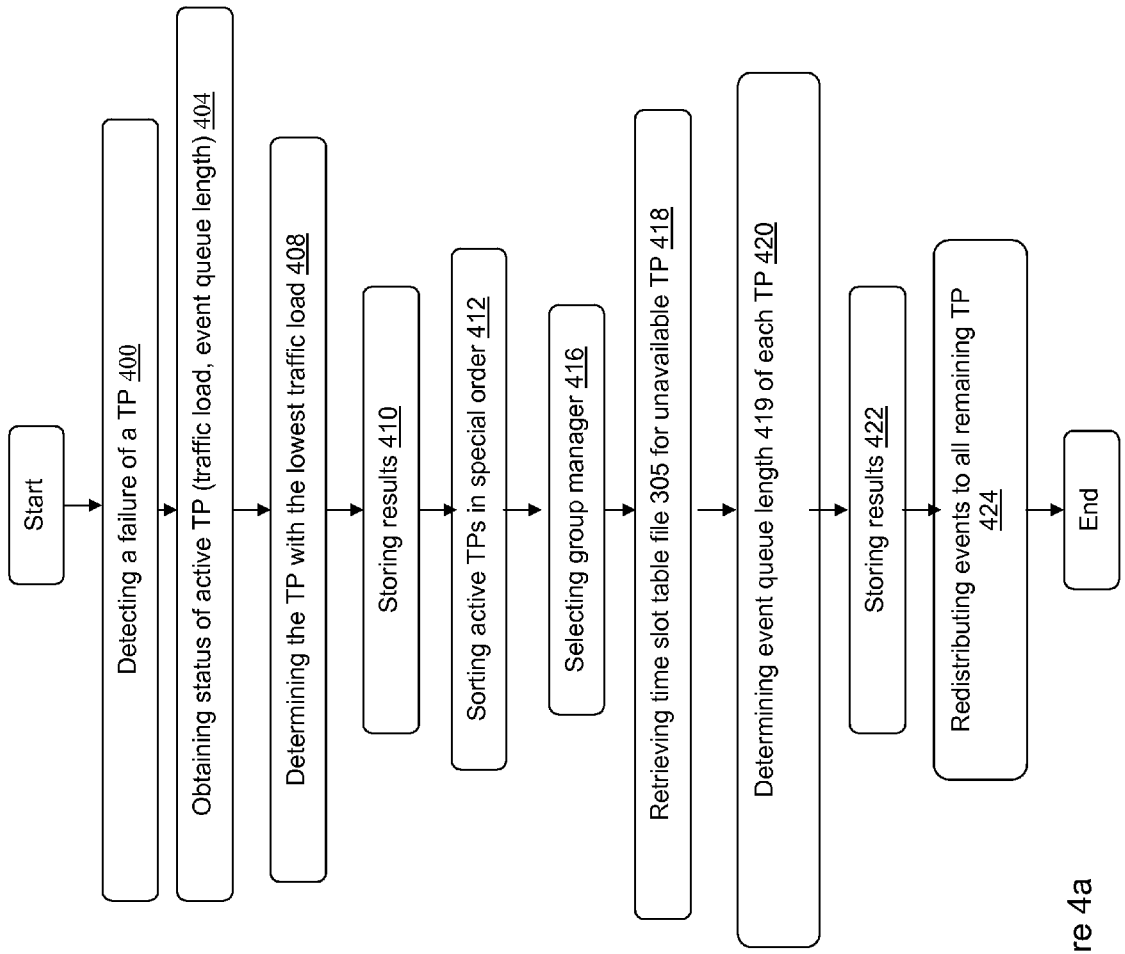
FIG. 4a is a flow chart of a method for re-distributing traffic after a permanent failure of a traffic processor in accordance to the invention.
Figure 6A:
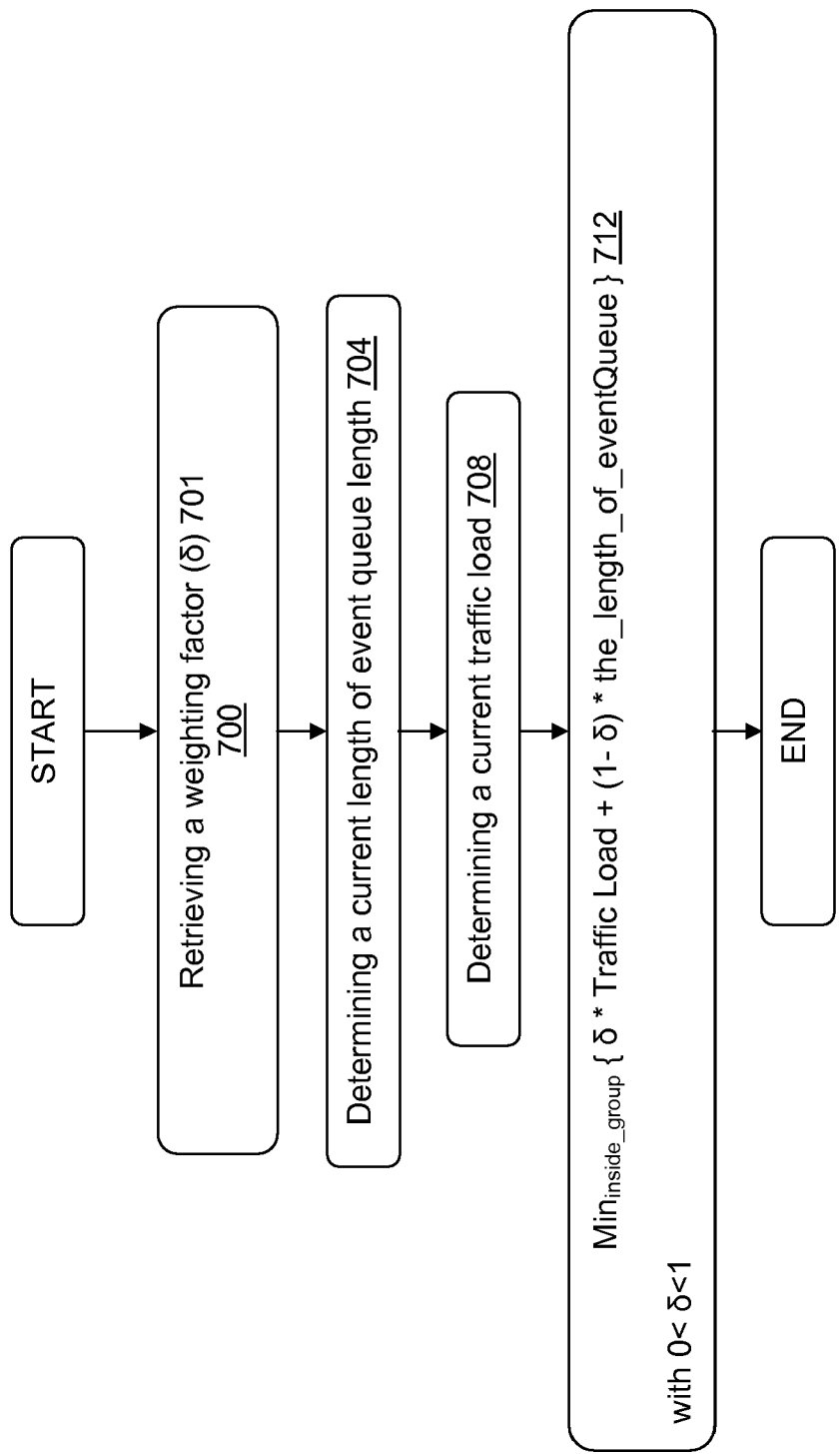
FIG. 6a is a flow chart of an exemplary algorithm for determining the traffic load of a traffic processor.

FIG. 4a describes a flow chart of a method for re-distributing traffic (e.g. event delivery) when a permanent failure is detected in a TP 24 of the messaging system 200. For example in FIG. 4a, TP3 may fail for any reason e.g. overload of a TP or malfunction of the TP. The event scheduler group 20, which controls and operates the communication node 200 detects that a TP 24 has failed (step 400). At step, 404, the event scheduler group 20 obtains the status of active TP, which consist on obtaining the TL 25 and event queue length in EQ 41 from list 300. The event scheduler group manager 205 is selected by voting on the status (traffic loads and event queue length). At step 408, the selected event scheduler group manager 205 determines the TP with the lowest traffic load. This determination can be made for each TP based on their traffic load (e.g. TL 25), the length of event queue (e.g. EQ 41) and a weighting factor ($\delta$) 701, which is used to determine whether emphasis of the sorting priority is placed on the traffic load or on the allowable queue length of a TP 24. The weighting factor is stored in the database 206 and may be pre-defined by an operator of network 10 or determined by the manager 205. FIG. 6a describes the steps of an exemplary algorithm for determining the TP 24 with the lowest traffic load. The manager 205 retrieves the weighting factor ($\delta$) 701 (step 700), a current event queue length (e.g. EQ 41) (step 704), the current traffic load (e.g. TL 25) (step 708). Then at step 712, the manager 205 computes the following:

$$\text{Min}_{inside\_group}\{\delta*\text{Traffic Load}+(1-\delta)*\text{the\_length\_of\_eventQueue}\}, \text{with } 0<\delta<1$$

Following the determination of step 408, the manager stores the results in the database 206 (step 410). The manager 205 then sorts the TPs 24 in the list 300 (step 412). This algorithm determines the value to be used for sorting remaining active TP 24 in a special order determined at step 712 (step 412). The sorting of TPs 24 is for determining how to handle the re-distribution task among TPs 24. Thus, the events (i.e. EQ 41 and TL 25) of the failed TP (or server) are redistributed in event queues of each remaining TP, preferably according to the priority sorting (e.g. from the TP having the lowest traffic load to the TP having the heavy traffic load), while ensuring that the queue does not exceed a determined allowable length. The allowable queue length can be determined based on an algorithm. At step 416, an event scheduler is selected 205. The selected manager 205 may be the same ES 21—the ES 21 executing steps 400 to 424-or a different ES 21.

Figure 6B:
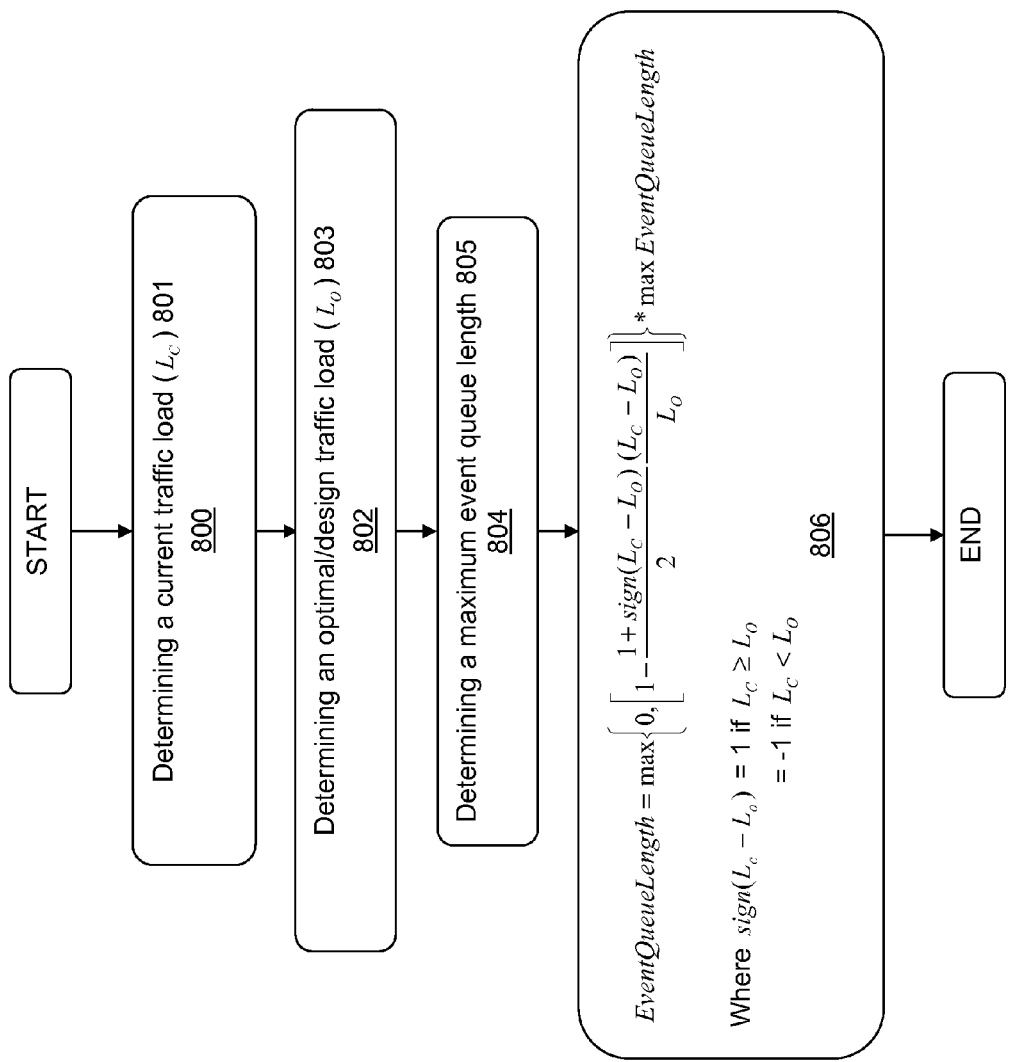
FIG. 6b is a flow chart of an exemplary algorithm for determining the allowable event queue length for a traffic processor.

The selected event scheduler group manager 205, which is in electronic communication (e.g. wireless connection or wired connection) with the MFS 23, retrieves the time slot 305 for event delivery of the failed TP3 (step 418). The time slot is stored in the MFS 23 and can be viewed in detail on FIG. 5. FIG. 5 illustrates a time slot 305 for delivery of events (e.g. message) to UEs 16 in a typical interval of time. The time slot 305 can be associated to any TP 24, those skilled in the art would understand that the time slot can be modified for being used for a month, year or any defined time interval. At step 420, the group manager 205 determines an allowable event queue length 419 of each TP 24. The allowable queue length 419 is applied by the manager 205 during a re-distribution step and based on the current traffic load (TL 25) of each TP 24 and on a determined or optimal traffic load. The allowable event queue length 419 is the threshold of the event queue length (e.g. EQ 41) for each TP 24. The events of the troubled TP are moved to remaining TP 24 until event queue length 419 is reached. FIG. 6b describes the steps of an exemplary algorithm for determining the allowable event queue length 419 for each TP 24. The manager 205 determines a current traffic load ($L_C$ 801) (step 801) and an optimal/design traffic load ($L_O$) 803 (step 802). The optimal/design traffic load ($L_O$) 803 is determined for providing optimal use of the set of TPs 22. The manager 205 then determines a maximum EventQueuelength 805 (step 804). Then at step 806, the manager 205 computes the following:

$$EventQueueLength = \max\left\{0, \left[1 - \frac{1+\text{sign}(L_C - L_O)}{2}\frac{(L_C - L_O)}{L_O}\right]\right\} * \max EventQueueLength$$

Where $$\text{sign}(L_c - L_o) = 1 \text{ if } L_C \geq L_O$$
$$= -1 \text{ if } L_C < L_O$$

Then, the allowable length is set to 0, if the current traffic load exceeds a threshold corresponding to an optimal/design traffic load. The result of the algorithm is stored in the database 206.

Following the computation of the event queue length, the results are stored in the database 206 (step 422) and then the group manager 205 re-distributes the traffic and event queue length of the failed TP3 to all remaining active TPs 24 (step 424).

Figure 4B:
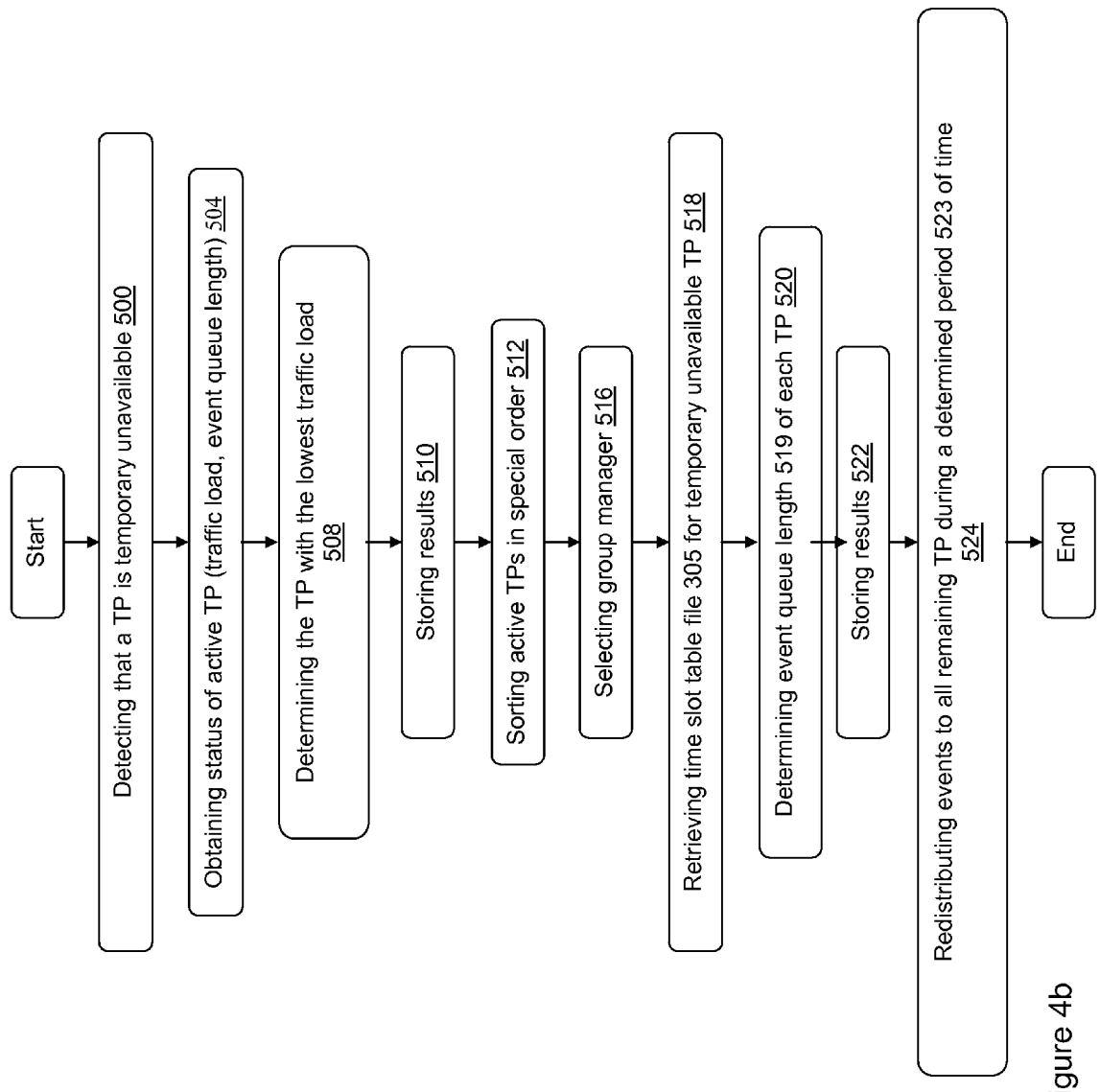
FIG. 4b is a flow chart of a method for re-distributing traffic after a temporarily failure of a traffic processor in accordance to the invention.

Alternatively, a TP 24 may not have been permanently failed and may recover after a period of time. The TP 24 may also be temporary shut down for maintenance purposes. In such case the events scheduled during a certain period of time need to be delivered by active TP 24. FIG. 4b describes a flow chart of a method for re-distributing traffic when a temporary failure of a TP 24 of the messaging system 200 occurs. The example is given for TP3 that may be temporarily shut down. The selected event scheduler group manager 205, which is in electronic communication (e.g. wireless connection or wired connection) with the MFS 23, detects that a TP 24 is temporarily unavailable (step 500).

At step 504, the event scheduler group 20 obtains the status of active TP, which consist on obtaining the TL 25 and event queue length in EQ 41 from list 300. The event scheduler group manager 205 is selected by voting on the status (traffic loads and event queue length). At step 508, the selected event scheduler group manager 205 determines the TP with the lowest traffic load. This determination can be made for each TP based on their traffic load (e.g. TL 25), the length of event queue (e.g. EQ 41) and a weighting factor ($\delta$) 701, which is used to determine whether emphasis of the sorting priority is placed on the traffic load or on the allowable queue length of a TP 24. The weighting factor is stored in the database 206 and may be pre-defined by an operator of network 10 or determined by the manager 205. FIG. 6a describes the steps of an exemplary algorithm for determining the TP 24 with the lowest traffic load. The manager 205 retrieves the weighting factor ($\delta$) 701 (step 700), a current event queue length (e.g. EQ 41) (step 704), the current traffic load (e.g. TL 25) (step 708). Then at step 712, the manager 205 computes the following:

$$\text{Min}_{inside\_group}\{\delta*\text{Traffic Load}+(1-\delta)*\text{the\_length\_of\_eventQueue}\}, \text{with } 0<\delta<1$$

Following the determination of step 508, the manager stores the results in the database 206 (step 510). The manager 205 then sorts the TPs 24 in the list 300 (step 512). This algorithm determines the value to be used for sorting remaining active TP 24 in a special order determined at step 712 (step 512). The sorting of TPs 24 is for determining how to handle the re-distribution task among TPs 24 during the period where the TP3 is unavailable. Thus, the events (i.e. EQ 41 and TL 25) of the failed TP (or server) are redistributed in event queues of each remaining TP, preferably according to the priority sorting (e.g. from the TP having the lowest traffic load to the TP having the heavy traffic load), while ensuring that the queue does not exceed a determined allowable length. The allowable queue length can be determined based on an algorithm. At step 616, an event scheduler is selected 205. The selected manager 205 may be the same ES 21—the ES 21 executing steps 500 to 524—or a different ES 21.

The manager 205 retrieves the time slot 305 for event delivery of the temporary unavailable TP3 as defined in step 418 (step 518). At step 520, the group manager 205 determines an allowable event queue length 519 of each TP 24. The allowable queue length 519 is applied by the manager 205 during a re-distribution step and based on the current traffic load (TL 25) of each TP 24 and on a determined or optimal traffic load. The allowable event queue length 519 is the threshold of the event queue length (e.g. EQ 41) for each TP 24. The events of the troubled TP are moved to remaining TP 24 until their event queue length 519 is reached. FIG. 6b describes the steps of an exemplary algorithm for determining the event queue length 519. Then, at step 524 the group manager 205 re-distributes traffic load during the determined period 523 for which the TP3 cannot deliver messages. The determined period corresponds to the time during which the TP 24 is unavailable.

Figure 4C:
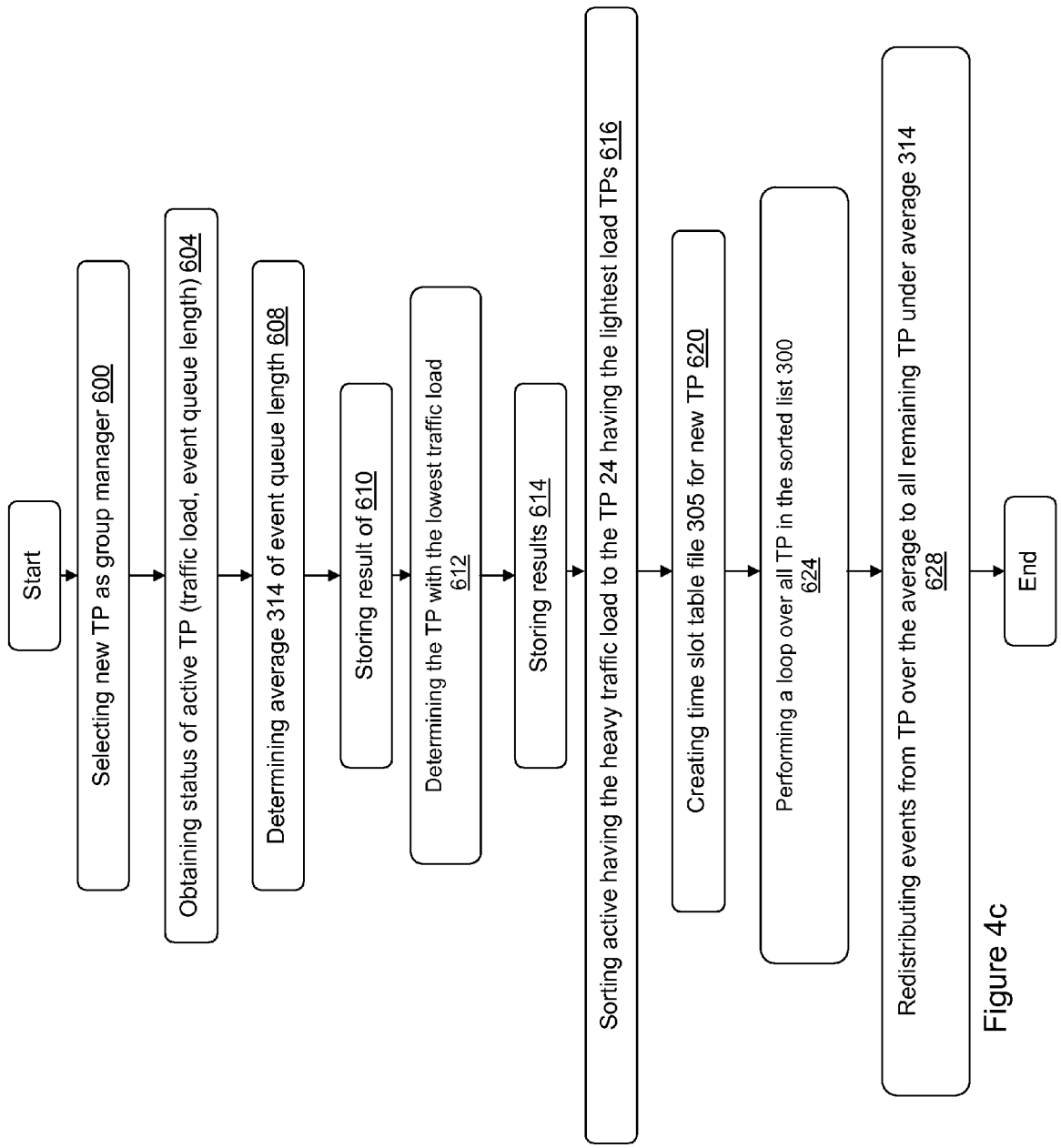
FIG. 4c is a flow chart of a method for re-distributing traffic when a traffic processor recovers in a set of traffic processors or when a traffic processor is added to the set of traffic processors.

A TP 24 may also be added to the communication node 200. Thus, FIG. 4c describes a flow chart of a method for re-distributing traffic when a TP 24 recovers from failure or when a TP 24 is added to the messaging system 200. The method starts at step 600, the event scheduler group 20 selects and determines that the new TP 24 is the group manager 205. The selected event scheduler group manager 205 then retrieves the status for all the existing TPs (traffic load and event length) (step 604). It then determines the average 314 of event queue length per TP 24 based on list 300 (step 608). The manager 205 then stores the result of the average in the database 206. At step 612, the selected event scheduler group manager 205 determines the TP with the lowest traffic load. This determination can be made for each TP based on its traffic load (e.g. TL 25), the length of event queue (e.g. EQ 41) and a weighting factor ($\delta$) 701, which is used to determine whether emphasis of the sorting priority is placed on the traffic load or on the allowable queue length of a TP 24. The weighting factor is stored in the database 206 and may be pre-defined by an operator of network 10 or determined by the manager 205. FIG. 6a describes the steps of an exemplary algorithm for determining the TP 24 with the lowest traffic load. The manager 205 retrieves the weighting factor ($\delta$) 701 (step 700), a current event queue length (e.g. EQ 41) (step 704), the current traffic load (e.g. TL 25) (step 708). Then at step 712, the manager 205 computes the following:

$$\text{Min}_{inside\_group}\{\delta*\text{Traffic Load}+(1-\delta)*\text{the\_length\_of\_eventQueue}\}, \text{ with } 0<\delta<1$$

Following the determination of step 612, the manager stores the results in the database 206 (step 614). The manager 205 then sorts the remaining active TP 24 in the list 300 from the TP 24 having the heavy traffic load to the TP 24 having the lightest load (step 616). At step 620, a time slot 305 is created in the MFS 23 for the newly added TP 24. The event scheduler group manager 205 then performs a loop over all TP 24 of the messaging system 200 for determining heavy traffic in order to light traffic load from overloaded TP (step 624). Thus, some events are removed from the EQ 41 of heavily loaded and/or high priority TP 24 and placed in a queue for the new TP 24. Then, at step 628 the group manager 205 (e.g. event scheduler of the added TP 24) re-distributes traffic load of each TP over the average 314 to each TP 24 under the average 314 (step 628).

It can be understood that some messages and therefore some parameters sent between communication nodes of the communication network 10 are omitted for clarity reasons. More particularly, it should also be understood that the Figures depict a simplified network 10, and that many other communication nodes have been omitted for clarity reasons only. Hence, the network 100 may comprise more than the number of communication nodes present in the Figures.

Modifications and variations are possible in light of the above teachings or may be acquired from practice of the invention. The following claims and their equivalents define the scope of the invention.

What is claimed is:

1. A method for distributing event delivery for a set of traffic processors in a telecommunication network, the method comprising the steps of:
   obtaining a status for each active traffic processors of the set of processors in the telecommunication network, by an event scheduler;
   determining a traffic processor having the lowest traffic load from the set of traffic processors, based on the obtained status for each active traffic processor, the traffic load of each of the traffic processors being determined in accordance with a weighting factor, an event queue length and a current traffic load;
   determining an allowable event queue length for each traffic processor of the set of traffic processors, the event queue length being a threshold for redistributing event delivery,; and
   re-distributing, by an event scheduler, the event among the set of traffic processors starting with the traffic processor having the lowest traffic load and without exceeding each determined allowable event queue length.

2. The method of claim 1, wherein the step of obtaining includes a step of detecting a failure in at least one traffic processor in the set of traffic processors, the at least one traffic processor being permanently or temporarily unavailable.

3. The method of claim 2, further comprising the steps of:
   sorting each traffic processor from the set of traffic processors from the traffic processors having the lowest traffic load to the traffic processor having a heavy traffic load; and
   selecting an event group manager from the sorted set of traffic processors.

4. The method of claim 3, wherein the step of sorting includes the steps of:
   sorting each traffic processor from the set of traffic processors that remain from the failure; and
   storing the results of the sorting in a database.

5. The method of claim 3, wherein the step of determining the allowable event queue length further includes a step of storing the results of the determination in a database of the event group manager.

6. The method of claim 1, further including the step of selecting an event group manager, wherein the selected event group manager is the event scheduler that manages the traffic processor having the lowest traffic load of the set of traffic processors.

7. The method of claim 1, wherein the set of traffic processors is a set of messaging servers.

8. The method of claim 1, wherein the event scheduler manages one or more traffic processors.

9. The method of claim 1, wherein the step of determining the allowable event queue length comprises determining the allowable event queue length based on a current traffic load, an optimal traffic load and a maximum event queue length for each traffic processor.

10. A method for distributing event delivery for a set of traffic processors in a telecommunication network, the method comprising the steps of:
   adding a traffic processor to the a set of traffic processors by an event scheduler;
   obtaining a status for each active traffic processors of the set of processors in the telecommunication network;
   determining at least one traffic processor having a heavy traffic load based on the obtained status for each active traffic processor, the traffic load of the at least one traffic processor being determined in accordance with a weighting factor, an event queue length and a current traffic load;
   removing event delivery from the at least one traffic processor having the heavy traffic load to the added traffic processor;
   determining an average of event queue length for each traffic processor of the set of traffic processors; and
   re-distributing, by the event scheduler, the event delivery of each traffic processors having an event queue length over the determined average to each traffic processor having an event queue length under the determined average.

11. The method of claim 10, further comprising the steps of:
   determining a traffic processor having the lowest traffic load from the set of traffic processors, the traffic load being determined for each traffic processor of the set of traffic processors based on a weighting factor, an event queue length and a current traffic load;
   sorting each traffic processor from the set of traffic processors from the traffic processor having the lowest traffic load to the traffic processor having the heavy traffic load; and
   selecting the added traffic processor as the event scheduler for distributing event delivery among the set of traffic processors.

12. The method of claim 11, wherein the step of determining the average includes a step of storing the results of the determination in a database of the event scheduler.

13. The method of claim 11, wherein the step of determining the traffic processor having the lowest traffic load includes a step of storing the results of the determination in a database of the event scheduler.

14. A communication node for managing event delivery in a telecommunication network, the communication node comprising:
   an event scheduler group for distributing event delivery to a set of traffic processors;
   wherein the event scheduler group comprises an event scheduler group manager for managing the communication node and the set of traffic processors, obtaining a status for each active traffic processor of the set of traffic processors, determining a traffic processor having the lowest traffic load from the set of traffic processors, determining an allowable event queue length for each traffic processor of the set of traffic processors, the event queue length being a threshold for redistributing event delivery, re-distributing the event among the set of traffic processors starting with the traffic processor having the lowest traffic load and without exceeding each determined allowable event queue length, and wherein the event scheduler group manager determines the traffic processor having the lowest traffic load based on a weighting factor, an event queue length and a current traffic load.

15. The communication node of claim 14, wherein the event scheduler group selects an event scheduler group manager, the event group manager is an event scheduler that manages the traffic processor having the lowest traffic load of the set of traffic processors.

16. The communication node of claim 15, wherein the event scheduler group manager is elected based on the following:
   $\text{Min}_{inside\_group}\{\delta*\text{TrafficLoad}+(1-\delta)*\text{the\_length\_of\_eventQueue}\}$,
   with $0<\delta<1$ and where $\delta$ is the weighting factor.

17. The communication node of claim 14, wherein the event scheduler group manager determines the allowable event length for redistributing event delivery based on the current traffic load ($L_c$), ($L_o$) and an optimal/design traffic load ($L_o$):

$$EventQueueLength = \max\left\{0, \left[1 - \frac{1+\text{sign}(L_C-L_O)}{2}\frac{(L_C-L_O)}{L_O}\right]\right\}*\max EventQueueLength$$

Where $$\text{sign}(L_c - L_o) = 1 \text{ if } L_C \geq L_O$$
$$= -1 \text{ if } L_C < L_O$$

18. The communication node of claim 14, wherein the event scheduler group manager detects a failure in at least one traffic processor in the set of traffic processors, the at least one traffic processor being permanently or temporarily unavailable.

19. The communication node of claim 14, wherein the event scheduler group manager adds a traffic processor to the set of traffic processors, selects the event scheduler of the added traffic processor as event scheduler group manager, obtains a status for each active traffic processors of the set of processors in the telecommunication network, determines the average of event queue length for each traffic processor of the set of traffic processors, determines a traffic processor having the lowest traffic load from the set of traffic processors, sorts each traffic processor from the set of traffic processors and re-distributing the event among each traffic processor of the set of traffic processors starting with the traffic processor having the lowest traffic load.

20. The communication node of claim 14, wherein the event scheduler manages one or more traffic processors.

21. The communication node of claim 14, wherein the communication node is a messaging system.

22. The communication node of claim 14, wherein the event scheduler group manager is further for sorting each traffic processor from the set of traffic processors from the traffic processors having the lowest traffic load to the traffic processor having a heavy traffic load, and selecting an event group manager from the sorted set of traffic processors.

* * * * *

UNITED STATES PATENT AND TRADEMARK OFFICE
CERTIFICATE OF CORRECTION

| | | |
|---|---|---|
| PATENT NO. | : 7,817,544 B2 | Page 1 of 1 |
| APPLICATION NO. | : 11/963996 | |
| DATED | : October 19, 2010 | |
| INVENTOR(S) | : Zhu et al. | |

It is certified that error appears in the above-identified patent and that said Letters Patent is hereby corrected as shown below:

On the Title Pg, Item (73), under "Assignee", Line 1, delete "Ericcson" and insert -- Ericsson --, therefor.

In Fig. 3, Sheet 3 of 9, in Box "312", in Line 3, delete "($Min_{inside\ group}$)" and insert -- ($Min_{inside\_group}$) --, therefor.

In Column 3, Line 20, delete "techniques" and insert -- techniques, --, therefor.

In Column 6, Line 61, in Equation, delete "$Min_{inside-group}$" and insert -- $Min_{inside\_group}$ --, therefor.

In Column 8, Line 36, in Claim 1, delete "delivery,;" and insert -- delivery; --, therefor.

In Column 9, Line 11, in Claim 10, delete "the a" and insert -- the --, therefor.

In Column 10, Line 15, in Claim 16, delete "elected" and insert -- selected --, therefor.

Signed and Sealed this
Eighth Day of February, 2011

David J. Kappos
*Director of the United States Patent and Trademark Office*